United States Patent Office 2,892,828
Patented June 30, 1959

2,892,828

TRIAZINE MONOAZO DYESTUFFS

William Elliot Stephen, Manchester, England, assignor to Imperial Chemical Industries Limited, London, England, a corporation of Great Britain No Drawing. Application November 25, 1955
Serial No. 549,177

Claims priority, application Great Britain
November 29, 1954

10 Claims. (Cl. 260—153)

This invention relates to new monoazo dyestuffs and more particularly it relates to new monoazo dyestuffs which are valuable for the production of fast orange colourations on cellulosic materials.

In United Kingdom specification No. 209,723 there is described the manufacture of azo dyestuffs by synthesising dyestuffs containing one or more cyanuric nuclei, (1) by uniting together or with other suitable components by reactions which lead to the formation of azo dyestuffs, intermediate products containing one or more cyanuric nuclei, or (2) by uniting azo dyestuffs containing appropriate groupings, either to each other or to other complexes, radicals or suitable residues by reaction with the halogen of cyanuric halides.

In the said specification there are disclosed monoazo dyestuffs, wherein there are attached to the triazine ring two chlorine atoms and which are obtained by reaction of one molecular proportion of an aminonaphthol sulphonic acid with one molecular proportion of cyanuric chloride and subsequently treating the product with a diazo compound obtained by diazotising for example aniline, p-toluidine, p-aminoacetanilide or m-xylidine. There are also disclosed monoazo dyestuffs, wherein there are attached to the triazine ring one chlorine atom and one anilino group, and which are obtained by reaction of one molecular proportion of an aminonaphthol sulphonic acid and one molecular proportion of aniline with one molecular proportion of cyanuric chloride and subsequently treating the product with a diazo compound obtained for example by diazotising aniline or a substitution product of aniline having a negative substituent, for example Cl, $CO_2H$ or $SO_3H$, or m-xylidine or a monosulphonated naphthylamine.

There is no compound disclosed in the said specification, however, which contains attached to the triazine ring, in addition to two atoms of chlorine, the residue of an aminonaphthol sulphonic acid coupling component to which is attached the residue of a diazo component of the benzene series which contains sulphonic acid groups.

We have found that certain monoazo dyestuffs of the kind containing two chlorine atoms attached to the triazine ring and also an aminonaphthol sulphonic acid radical containing an ortho-sulphophenylazo substituent, which dyestuffs in their free acid form are represented by the formula given below have superior tinctorial value and superior fastness to wet treatments, as compared with monoazo dyestuffs of comparable shade specifically described in United Kingdom specification No. 209,723 containing only 1 chlorine atom attached to the triazine ring and superior fastness to light as compared with monoazo dyestuffs of comparable shade specifically described in United Kingdom specification No. 209,723 which contain two chlorine atoms attached to the triazine ring but which do not contain the ortho-sulphophenylazo substituent, when the dyestuffs are applied to cellulosic textile materials by a process which comprises impregnating the said textile materials with the dyestuff in aqueous solution and subsequently subjecting the textile material to the action of an acid-binding agent in aqueous medium for a short time, of the order of only a few minutes, advantageously in the presence of an electrolyte such as sodium chloride or sodium sulphate.

According to our invention we provide new monoazo dyestuffs which in the form of their free acids are of the formula:

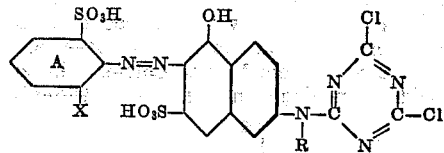

wherein the benzene nucleus A optionally bears further substituents other than hydroxyl and amino groups, X stands for a hydrogen atom or a substituent other than halogen, and R stands for a hydrogen atom or for a hydrocarbon radical.

According to our invention we also provide a process for the manufacture of the said new monoazo dyestuffs which comprises diazotising a primary aromatic amine of the formula:

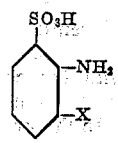

wherein X has the meaning stated above and the benzene nucleus may optionally bear further substituents other than hydroxy and amino groups, and coupling the diazo compound thus formed with a coupling component of the formula:

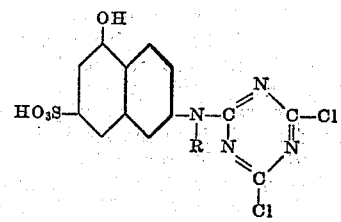

wherein R has the meaning stated above.

According to a further feature of our invention we provide an alternative process for the manufacture of the said new monoazo dyestuffs which comprises reacting a monoazo compound which is in the form of its free acid is of the formula:

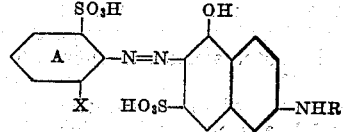

wherein X and R have the meanings stated above and the benzene nucleus A may optionally bear further substituents other than hydroxyl and amino groups, with one molecular proportion of cyanuric chloride.

As primary aromatic amines which may be used in the process of our invention there may be mentioned aniline-2-sulphonic acid, aniline 2:5-disulphonic acid, 2:4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3:4-dichloroaniline-6-sulphonic acid, 4-methylaniline-2-sulphonic acid, 3-methylaniline-6-sulphonic acid, 2:4-dimethoxyaniline-6-sulphonic acid, 4-methoxyaniline-2-sulphonic acid and 5-methoxyaniline-2-sulphonic acid.

As coupling components for use in the azo coupling process of our invention there may be used for example the primary condensation products obtained by reaction of 2-amino-5-naphthol-7-sulphonic acid, or derivatives of 2-amino-5-naphthol-7-sulphonic acid containing a hydrocarbon radical as a substituent in the amino group, with one molecular proportion of cyanuric chloride in aqueous medium.

The monoazo compounds used as starting materials for reaction with cyanuric chloride by the alternative process of our invention may be obtained by diazotising a primary aromatic amine, as defined above, and coupling the diazo compound thus obtained in alkaline medium with a coupling component of the formula:

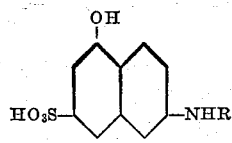

wherein R has the meaning stated above, or alternatively, when the said diazo compound does not contain an acylamino group, by coupling the said diazo compound in alkaline medium with the N-acyl derivative of such a coupling component and subsequently removing the acyl group by hydrolysis with for example caustic soda.

In the process of our invention, the diazotising of the amino compound and the coupling of the diazo compound thus produced with the coupling component is preferably carried out at a temperature below 5° C., conveniently at 0–5° C. In the process of our invention wherein there is used a coupling component containing the cyanuric nucleus it is advantageous to use for the coupling reaction the said coupling component prepared in situ at temperatures of 0°–5° C. by methods known from the literature and to carry out the couplings at similar temperatures and at as low a pH as is possible for efficient coupling, in order that side reactions, for example hydrolysis of the chlorine atoms remaining attached to the triazine ring, are minimised.

Similarly, in order to avoid such side-reactions during manufacture and storage it is generally preferable to isolate the new dyestuffs from the media in which they have been formed at a pH from 6.4 to 7.8 and to dry the resultant dyestuff pastes at relatively low temperatures, for example between 20° and 40° C., preferably in the presence of buffering agents suitable for maintaining a pH value of about 6.5. Examples of such buffering agents are mixtures of disodium hydrogen phosphate and sodium dihydrogen phosphate or of disodium hydrogen phosphate and potassium dihydrogen phosphate.

In the manufacture of the new dyestuffs of the invention by the said alternative process namely by reacting equimolecular proportions of a monoazo compound of the formula stated and cyanuric chloride the reaction is preferably carried out in aqueous medium at temperatures between 0° and 5° C.

The new dyestuffs of this invention in the form of their alkali metal salts are readily soluble in water and are especially suitable for the production of level and fast orange colourations on cellulosic textile materials by continuous dyeing techniques, for example by a process which comprises impregnating the said textile materials with a solution of the dyestuff and thereafter subjecting the textile materials, optionally after drying, to the action of an acid-binding agent for example caustic soda, in aqueous medium which advantageously contains an electrolyte such as sodium chloride or sodium sulphate, for a short period of time, commonly of the order of only a few minutes, at temperatures conveniently lying between atmospheric temperature and the temperature of the boiling solution, and also by printing methods, for example by a process which comprises applying to the said textile materials a printing paste containing the dyestuff and a substance on heating or steaming liberates an acid-binding agent, for example sodium bicarbonate, and subsequently subjecting them to the action of heat or steam. The colourations thus produced possess a very good fastness to light and a high degree of fastness to wet treatments, especially to repeated washing.

The invention is illustrated but not limited by the following example in which the parts are by weight:

*Example 1*

A solution of 18.5 parts of cyanuric chloride in 100 parts of acetone is poured into a stirred mixture of 400 parts of water and 400 parts of crushed ice, and 2 parts of 2 N hydrochloric acid are added. To the suspension of cyanuric chloride thus obtained there are added during 40 minutes, and at a temperature below 5° C., 26.1 parts of the sodium salt of 2-amino-5-naphthol-7-sulphonic acid as a solution in 480 parts of water, made faintly alkaline to Brilliant Yellow by the addition of sodium carbonate. The mixture is stirred at a temperature below 5° C. for 1 hour and then 6 parts of 2 N sodium carbonate solution are added and stirring is continued at the same temperature for another 20 minutes. A suspension of the diazo compound from 16.45 parts of aniline-2-sulphonic acid, obtained by diazotising the aniline-2-sulphonic acid in a mixture of 200 parts of water and 18 parts of hydrochloric acid (specific gravity 1.18) at a temperature between 0° and 2° C. with 6.55 parts of sodium nitrite, is then added to the mixture during 5 minutes at a temperature between 0° and 4° C. 40 parts of sodium acetate crystals are added during 10 minutes and the mixture is stirred at 0° to 4° C. for 90 minutes, after which time sufficient anhydrous sodium carbonate is gradually added during a further 90 minutes to render the aqueous medium slightly alkaline to litmus. Sufficient sodium chloride to give a concentration of 200 grams per litre is added and the mixture is stirred for 30 minutes, while the temperature is maintained between 0° and 4° C., and the mixture is filtered, and the solid on the filter is washed with 20% brine and then with acetone and dried at 20° to 45° C. The product forms a red-brown solid which dissolves in water to give an orange solution and in concentrated sulphuric acid to give a bluish red solution.

This product in the form of its free acid has the formula:

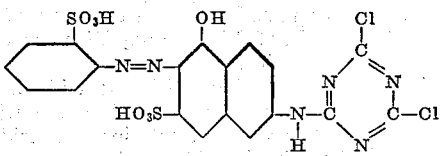

*Example 2*

An alternative method for the preparation of the dyestuff described in Example 1 is as follows:

18.5 parts of cyanuric chloride are dissolved in 100 parts of dry acetone and the solution is added gradually with stirring to a mixture of 300 parts of water and 400 parts of crushed ice. To the stirred suspension of cyanuric chloride so formed there is added during 40 minutes a solution in 800 parts of water at 20° C. of 46.7 parts of the disodium salt of the aminoazo compound which is formed by coupling diazotised 2-aminobenzene sulphonic acid with N-acetyl 2-amino-5-naphthol-7-sulphonic acid in the presence of sodium carbonate, purifying the product to remove from it any dyestuff formed by coupling on the 8-position of the N-acetyl 2-amino-5-naphthol-7-sulphonic acid, and hydrolysing to remove the acetyl group by heating it in an aqueous solution containing about 4% caustic soda at 80–85° C.

The temperature of the reaction mixture is maintained between 0° and 4° C. and within a few minutes of completing the addition of aminoazo compound none of it remains unchanged. The acid solution formed is made neutral to litmus by the addition of sodium carbonate solution and there is also added to it a solution containing 7 parts of anhydrous disodium hydrogen phosphate and 12.5 parts of anhydrous potassium dihydrogen phosphate in 100 parts of water. Sufficient salt to give a concentration of 100 grams per litre is added, and the mixture is stirred for a short time and is then filtered. The solid is mixed intimately with 4.2 parts of anhydrous disodium hydrogen phosphate and 7.5 parts of anhydrous potassium dihydrogen phosphate and dried at 20–30° C.

If the aminoazo compound used for condensation with cyanuric chloride in this example is replaced by an equivalent amount of one of the aminoazo compounds named in the list below and prepared in each case by coupling a diazo compound obtained from a derivative of aniline-2-sulphonic acid with an N-acyl-2-amino-5-naphthol-7-sulphonic acid, for example N-acetyl-2-amino-5-naphthol-7-sulphonic acid or an N-acyl-N-substituted 2-amino-5-naphthol-7-sulphonic acid, for example N-acetyl-N-methyl-2-amino-5-naphthol-7-sulphonic acid and removing if necessary any product formed by coupling on the 8-position of the 2-amino-5-naphthol-7-sulphonic acid residue and then hydrolysing the purified 6-coupled product by heating with caustic soda in aqueous solution, then the alternate dyestuffs formed all have the capability of giving bright colourations on cellulosic materials for example cotton, when applied from aqueous solutions by padding and after-treating the padded material, optionally after drying with an aqueous solution containing caustic soda and sodium chloride. The colourations so obtained, the shades of which given by the products from the various aminoazo compounds are also listed below all show very good fastness to severe washing and to soda boiling.

| Aminoazo compound reacted with cyanuric chloride | Shade of dyeings on cotton |
|---|---|
| 4-Toluidine-3-sulphonic acid diazotised and coupled with 2-amino-5-naphthol-7-sulphonic acid. | Bright reddish orange. |
| 5-chloro-4-methyl-2-aminobenzene-sulphonic acid diazotised and coupled with 2-amino-5-naphthol-7-sulphonic acid. | Orange. |
| 4-chloroaniline-2-sulphonic acid diazotised and coupled with 2-amino-5-naphthol-7-sulphonic acid. | Do. |
| Aniline-2:5-disulphonic acid diazotised and coupled with 2-amino-5-naphthol-7-sulphonic acid. | Golden orange. |
| Aniline-2-sulphonic acid diazotised and coupled with N-methyl-2-amino-5-naphthol-7-sulphonic acid. | Reddish orange. |
| 4-chloro-5-methyl-2-aminobenzenesulphonic acid diazotised and coupled with 2-amino-5-naphthol-7-sulphonic acid. | Orange. |
| 3-aminoanisole-4-sulphonic acid diazotised and coupled with 2-amino-5-naphthol-7-sulphonic acid. | Yellowish orange. |
| 3-toluidine-4-sulphonic acid diazotised and coupled with 2-amino-5-naphthol-7-sulphonic acid. | Do. |

What I claim is:

1. Monoazo dyestuffs which, in the form of their free acids, are of the formula:

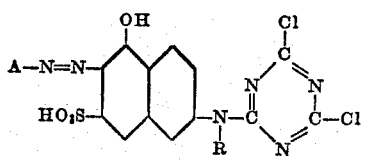

wherein R is selected from the group consisting of hydrogen and lower alkyl and A is a monocyclic aromatic radical free from hydroxyl and amino substitution, one of the positions in said radical A ortho to the —N=N— group being free of halogen substitution and the other position in said radical A ortho to the —N=N-group bearing an —SO₃H group.

2. The monoazo dyestuff which, in the form of its free acid, has the formula:

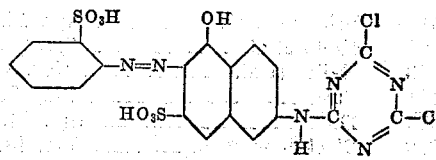

3.

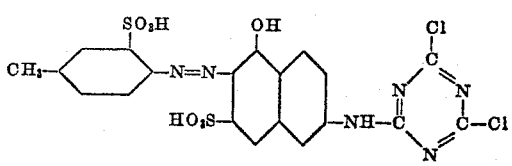

4.

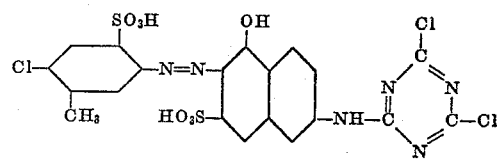

5.

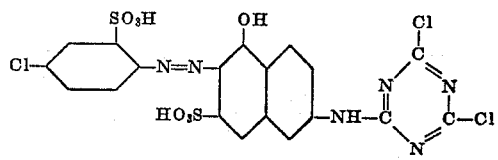

6.

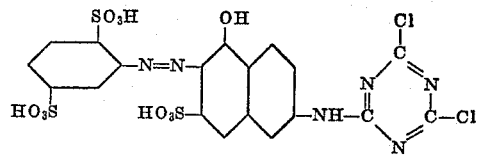

7.

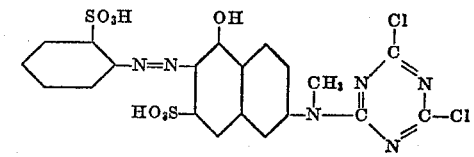

8.

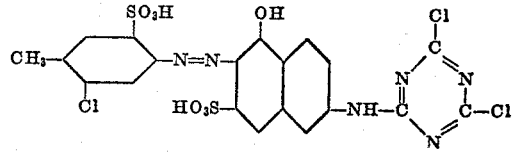

9.

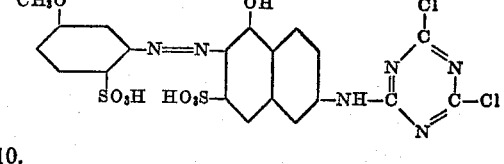

10.

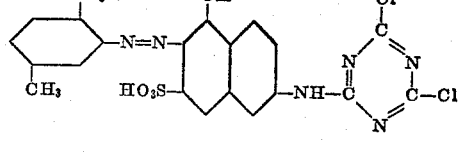

(References on following page)

References Cited in the file of this patent

UNITED STATES PATENTS

| | | |
|---|---|---|
| 1,667,312 | Fritsche et al. | Apr. 24, 1928 |
| 1,802,208 | Hoffa et al. | Apr. 21, 1931 |
| 1,886,480 | Haller et al. | Nov. 8, 1932 |
| 2,000,121 | Bush | May 7, 1935 |
| 2,093,424 | Dove | Sept. 21, 1937 |
| 2,339,739 | Blackshaw et al. | Jan. 18, 1944 |
| 2,384,283 | Conrad et al. | Sept. 4, 1945 |
| 2,722,527 | Wehrli et al. | Nov. 1, 1955 |

FOREIGN PATENTS

| | | |
|---|---|---|
| 111,274 | Switzerland | Aug. 1, 1925 |

OTHER REFERENCES

Venkataraman: Synthetic Dyes, 1952, pps. 461 and 587.